Sept. 13, 1960      A. V. VALDEZ      2,952,432
FISHING ROD HOLDER
Filed Aug. 30, 1957
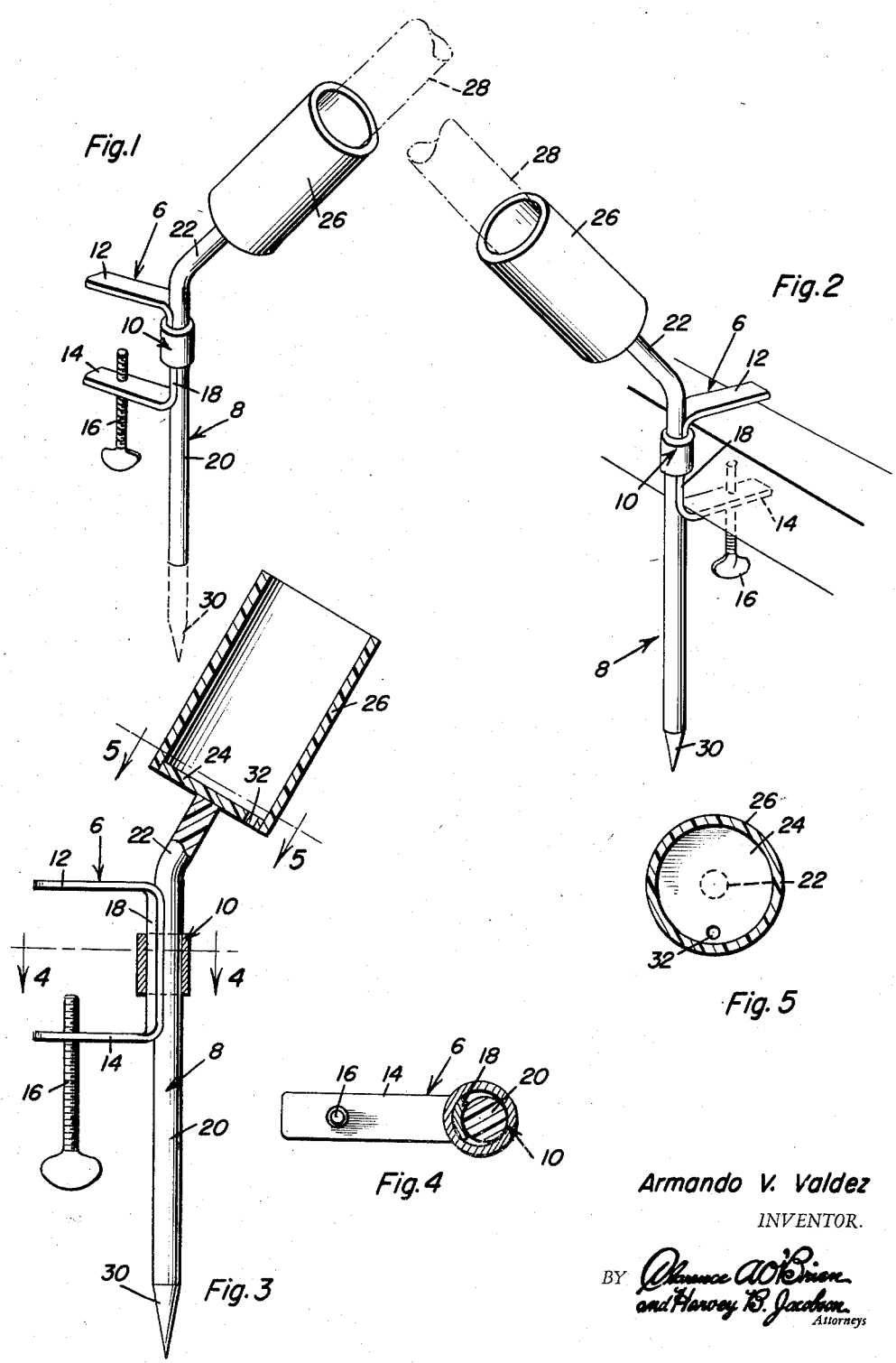
Armando V. Valdez
INVENTOR.

United States Patent Office

2,952,432
Patented Sept. 13, 1960

2,952,432

FISHING ROD HOLDER

Armando V. Valdez, 1537 Maryland St., Gary, Ind.

Filed Aug. 30, 1957, Ser. No. 681,244

1 Claim. (Cl. 248—42)

The present invention relates to certain new and useful improvements in supports generally speaking, and has reference in particular to the category of invention thereunder having to do with so-called fishing rod holders, but which are not necessarily restricted for the support of fishing rods only.

It is a matter of common knowledge that fishing rod holders are of many and varied styles and types. Some are such that the holding means may be staked or anchored on the water's edge or shore. Others are equipped with clamps of one type or another making it possible to attach the same to parts of a wharf, to the gunwale or other part of a boat, and so on. Just as the preceding description implies, the instant invention too is such in construction that through the medium of a simple U-shaped clamp and setscrew the holder may be attached to a stationary support such as a boat, means also being provided making it possible to press and stake the device in the ground for support requirements.

More specifically, in carrying out a preferred embodiment of the invention, an aspect thereof involves the use of a U-shaped clamp or bracket the bight portion of which is grooved to receive a portion of a socket supporting rod. The rod is cylindrical in cross-section and a tapered retaining collar is provided. When the collar is slipped down to its friction binding position, the rod is firmly attached to the clamp but the clamp in turn may be attached to a boat or elsewhere.

An additional feature is that wherein the lower end of the rod is pointed so that it may be forced and anchored in the ground. A cup-like socket is provided atop the rod and the upper portion of the rod is laterally offset to assume an oblique angle which positions the socket member in a satisfactory position to expeditiously insert and remove the handle of the fishing rod. Then, too, the bottom of the socket member or cup is provided with a drain hole.

Other objects, features and advantages will become more readily apparent from the following description and the accompanying drawing.

In the drawing, wherein like numerals are employed to designate like parts throughout the views:

Fig. 1 is a perspective view of the fishing rod holder in a preferred embodiment thereof showing how it may be staked on shore for use if so desired;

Fig. 2 is a view which is also in perspective and the purpose of which is to illustrate the alternative arrangement wherein the U-shaped bracket is attached to a relatively stationary support, for example a part of a boat or the like;

Fig. 3 is a view on a larger scale with portions broken away and appearing in section and illustrating the details of construction;

Fig. 4 is a section on the horizontal line 4—4 of Fig. 3, looking in the direction of the arrows;

Fig. 5 is a section on the horizontal line 5—5 of Fig. 3.

With reference now to the view of the drawing, it will be evident that the over-all assemblage is characterized by three complemental components, one of which may be designated as the attaching bracket 6, the other the rod holder proper 8 and the remaining part the assembling and clamping means 10.

Taking up first the bracket this is of U-shaped form and has upper and lower horizontal arms 12 and 14, with the lower arm apertured and screw threaded to accommodate a setscrew 16. These arms are joined by a bight portion 18 which, as brought out in Fig. 4 particularly, is arcuate in cross-section. This construction provides a groove or channel forming a seat for reception of a surface portion of the cylindrical rod or upright 20. This is perhaps best shown in Fig. 4 wherein the rod portion is seated in the groove or channel. This bight portion and also the rod are held together by an assembling and clamping collar 10. The latter is of metal and so is the bracket. On the other hand, the rod 20 is of a suitable grade of rigid commercial plastics. The two metal components cooperate wtih the plastic part in binding the several parts together to bring about the assembled relationship illustrated in the drawings. Then, too, it will be noticed that the collar or sleeve 10 not only surrounds the parts 18 and 20 but the bore thereof is tapered downwardly so that the more one shoves downwardly on the sleeve the more firmly it frictionally binds the encircled components 18 and 20.

The upper end portion of the rod is preferably laterally offset at the desired oblique angle as denoted at 22 and secured to the bottom 24 of a cup-like socket member 26. The socket member is such that it accommodatingly receives and supports the handle 28 of the fishing rod in a highly practical manner. That is to say, one can very easily insert and remove the handle depending on the needs of the moment. So that the device may also be staked on shore as seen in Fig. 1, the lower end of the rod is tapered and pointed to provide an anchoring prong 30. It may be added that the rod and holder are such in construction that the bend of 60° provides a highly satisfactory adaptation. The purpose of the bend in the rod is to have the fishing rod at such an angle that it can be had easily, in an obvious manner. The purpose of the drainage port 32 in the bottom of the cup is to allow water to escape so that there is less likelihood of one having to pick up and fish with a wet-handled fishing rod.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A fishing rod holder comprising a rigid rod the upper end portion of which is bent at an angle oblique to the axis of the body portion of the rod, a socket member adapted to receive a handle portion of a fishing rod, said socket member being open at its top and having a bottom fixed centrally atop the upper end portion of said rod, the lower end of said rod member being pointed to provide an anchoring prong, a substantially U-shaped clamp having a bight portion and arm portions extending laterally from said bight portion, one arm portion being provided with a setscrew, said bight portion being arcuate in cross-section and providing an outwardly facing open-ended seating and retaining channel, a median portion of said rod being seated adjustably and removably in said channel, and a manually applicable, removable and adjustable sleeve embracing the median portion of the rod and also the bight portion of said clamp, said sleeve serving as a coupling and clamp between the bight portion and median portion of said rod, the bore of said sleeve being tapered and the cross-section of said median portion being circular and of uniform cross-section whereby the sleeve is frictionally held in an intended coupling and clamping position.

References Cited in the file of this patent

UNITED STATES PATENTS

| | | |
|---|---|---|
| 1,577,612 | Dees | Mar. 23, 1926 |
| 1,760,592 | Gift | May 27, 1930 |
| 2,294,624 | Miller | Sept. 1, 1942 |
| 2,459,549 | Smith | Jan. 18, 1949 |
| 2,619,308 | Guestinger | Nov. 25, 1952 |

FOREIGN PATENTS

| | | |
|---|---|---|
| 687,695 | Great Britain | Feb. 18, 1952 |